Figure 1:

Sept. 15, 1942.  R. H. GRIFFITH ET AL  2,295,653
PREPARATION OF CATALYSTS
Filed Feb. 24, 1940

Inventors:
Roland Hall Griffith
John Herbert Geoffrey Plant.
By Stebbins, Blenko & Parmelee,
attys Patented Sept. 15, 1942

2,295,653

UNITED STATES PATENT OFFICE 2,295,653

PREPARATION OF CATALYSTS

Roland Hall Griffith and John Herbert Geoffrey Plant, London, England, assignors to The Gas Light & Coke Company, Westminster, London, England, a British company Application February 24, 1940, Serial No. 320,640
In Great Britain February 25, 1939

11 Claims. (Cl. 252—253)

This invention is for improvements in or relating to the preparation of catalysts and has particular reference to the preparation of nickel and cobalt sub-sulphide catalysts of the type employed in our specification Serial No. 194,716. In that specification the catalyst was prepared by soaking a porous supporting material such as china clay in a hot aqueous solution of nickel or cobalt chloride, precipitating the corresponding hydroxides in the pores of the support, by soaking in caustic soda, removing chloride by washing, reducing the nickel or cobalt hydroxide to the corresponding metal and thence to sulphide and sub-sulphide by heating in a stream of gas containing hydrogen and a proportion of organic sulphur compounds.

It is an object of the present invention to provide an alternative method for the preparation of supported sub-sulphide catalysts which method is cheaper and more efficient than that described in specification Serial No. 194,716.

We have now found that the process for preparing a sub-sulphide catalyst may be greatly facilitated and cheapened by using as the starting material nickel or cobalt in the form of a salt containing oxygen and sulphur and subjecting the said salt to reducing conditions such that the nickel or cobalt sub-sulphide is formed directly i. e. without passing through the oxide stage.

The present invention accordingly comprises a method of preparing a sub-sulphide catalyst of nickel or of cobalt which comprises soaking a porous support in a solution of a salt of nickel or of cobalt, which salt contains oxygen and sulphur and is directly reducible to sulphide, drying the impregnated support and converting the salt to sub-sulphide by heating at a temperature between 300° and 500° C. in a stream of reducing gas consisting of hydrogen or of a gas containing hydrogen. The temperature of reduction is preferably of the order of 350° C. The sub-sulphide formed according to the present invention is $Ni_3S_2$ or $Co_3S_2$.

The salt of nickel or cobalt employed may conveniently consist of sulphate, sulphite, thiosulphate or sulphamate, but of these compounds the sulphate is preferred.

The reducing gas in which the sulphate is reduced may contain a small proportion of oxygen. In one preferred method of carrying out the invention the salt is reduced to sub-sulphide by means of the gas which is to be treated for the conversion of organic compounds therein or by means of gas which has been so treated.

Substances having the property of activating the sub-sulphide catalyst may be added to the solution of the salt with which the porous support is impregnated.

The nickel or cobalt salt is introduced into the surface layers of a support such as pellets of burnt china clay by maintaining the solution at or near its boiling point, or alternatively by exhausting the air from the support and immersing the support in the solution. It has been found that boiling for approximately 5 minutes is sufficient to obtain an effective layer of nickel sulphate in the surface pores of china clay pellets.

The drying of the support is preferably carried out at or about 100° C. for one to two hours and this treatment has the effect of driving any sulphate which has penetrated beyond the surface layers towards the outer pores of the carrier in the manner described in specification Serial No. 194,716.

The invention further includes a modification of the method of preparing the sub-sulphide catalyst which comprises the step of adding the material, consisting e. g. of china clay pellets and containing a surface layer of a nickel or cobalt salt containing sulphur and oxygen, e. g. nickel or cobalt sulphate to the top of a catalyst bed which is already at work decomposing organic sulphur compounds, at the appropriate temperature in a gas such as coal gas. Catalyst is removed at intervals or continuously from the bottom of the catalyst bed. Reduction of the sulphate to sub-sulphide takes place rapidly under these conditions and the catalyst may be employed without further treatment.

Following is a description by way of example and with reference to the accompanying diagrammatic drawing of a method of carrying the invention into effect in preparing a nickel sub-sulphide catalyst for use in the purification of coal gas from organic sulphur compounds.

Figure 2:
Figure 3:
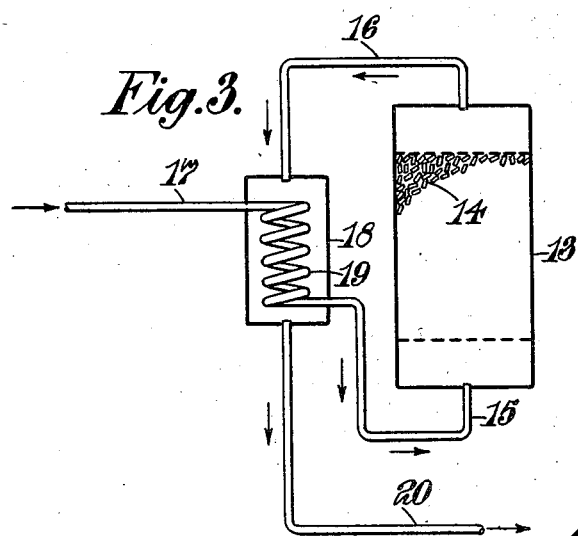
Figure 4:
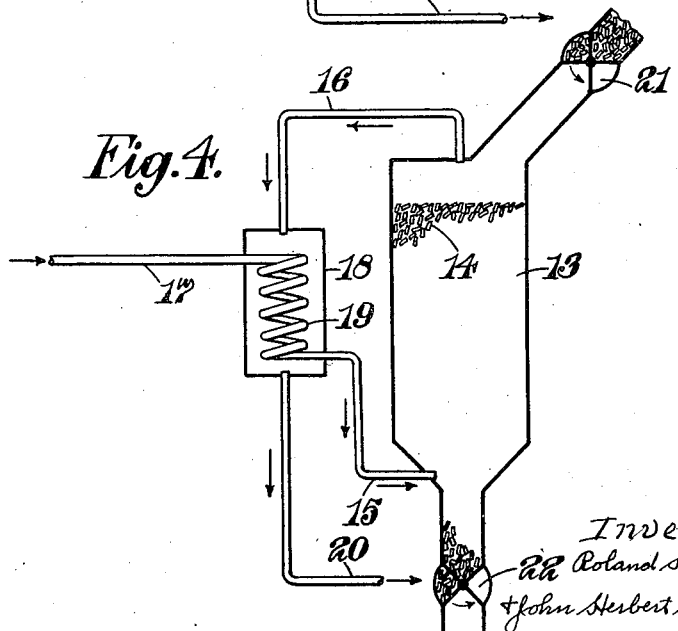

In the drawing:

Figure 1 shows a cylindrical china clay support carrying in its surface pores a layer of catalyst, Figure 2 is a cross-section of Figure 1, Figure 3 is a diagrammatic representation of one form of apparatus for carrying out the production of the sub-sulphide catalyst, and Figure 4 is an alternative form of apparatus in which the sub-sulphide catalyst is formed in apparatus employed for the treatment of a gas such as coal gas for the removal of organic sulphur compounds therefrom.

Referring to Figures 1 and 2, 11 is a solid cylindrical porous support of burnt china clay and 12 is a surface layer of sub-sulphide catalyst in the surface pores of the support.

Referring to Figures 3 and 4 in which similar reference numerals denote similar parts, 13 is a chamber to contain a charge 14 of impregnated catalyst supports of the kind shown in Figures 1 and 2, 15 is an inlet tube for reducing gas containing free hydrogen and 16 is the conduit by which the reducing gas leaves the catalyst chamber. Before entering the catalyst chamber the reducing gas passes by way of the pipe 17 through a heat interchanger 18 provided with a coil 19 which is heated externally by means of the hot gas leaving the catalyst chamber. This gas passes from the heat interchanger by way of the conduit 20.

Referring to Figure 4 the catalyst chamber 13 is arranged to operate for the continuous production of sub-sulphide catalyst. A substantially gas-tight rotary valve 21 is provided for charging impregnated porous supports into the catalyst chamber and a similar substantially gas-tight valve 22 is employed for removing the catalytic material from the bottom of the charge.

*Example*

China clay pellets of the kind shown in Figures 1 and 2 of the drawing and having a porosity of 25% (i. e. taking up 25% of their own weight of water) are heated in a boiling aqueous solution made up from 10 parts of nickel sulphate ($6\frac{1}{2}$ $H_2O$) and 15 parts water. Excess liquid is drained away and the pellets dried rapidly at about 100° C. for one hour. The deposit of nickel sulphate is reduced in a stream of coal gas at a temperature of 350° C. for two hours by use of the apparatus shown diagrammatically in Figure 3 or Figure 4. The resulting nickel sub-sulphide catalyst ($Ni_3S_2$) was found to be extremely active for the catalytic decomposition of organic sulphur compounds at temperatures e. g. of 200° to 225° C. from coal gas which has previously been freed from hydrogen sulphide. This catalyst is more active than the catalyst produced by direct reduction of nickel chloride or of nickel hydroxide and subsequent conversion of the reduced nickel to nickel sub-sulphide, and fewer precautions are needed in its preparation. The catalyst thus prepared may replace the catalyst described in our specification Serial No. 194,716.

We claim:

1. A method of preparing a catalyst consisting of the sub-sulphide of one of the group consisting of nickel and cobalt which comprises soaking a porous catalyst support in a solution of a salt of one of the group consisting of nickel and cobalt which salt contains oxygen and sulphur and is directly reducible to sulphide, drying the impregnated support and heating at a temperature between 300° and 500° C. in a stream of reducing gas containing hydrogen but containing substantially no sulphur dioxide in order to convert the salt to sub-sulphide.

2. A method of preparing a catalyst consisting of the sub-sulphide of one of the group consisting of nickel and cobalt which comprises soaking a porous catalyst support in a solution of a salt of one of the group consisting of nickel and cobalt, which salt contains oxygen and sulphur and is directly reducible to sulphide, drying the impregnated support and converting the salt to sub-sulphide by heating at a temperature substantially of the order of 350° C. in a stream of reducing gas containing free hydrogen but containing no sulphur dioxide.

3. A method of preparing a catalyst consisting of the sub-sulphide of one of the group consisting of nickel and cobalt, which comprises soaking a porous catalyst support in a solution of a salt selected from the group consisting of nickel, sulphate, sulphite, thiosulphate and sulphamate and cobalt sulphate, sulphite, thiosulphate and sulphamate, drying the impregnated support and converting the salt to sub-sulphide by heating at a temperature between 300° and 500° C. in a stream of reducing gas containing free hydrogen but containing no sulphur dioxide.

4. A method of preparing a catalyst consisting of the sub-sulphide of one of the group consisting of nickel and cobalt for the treatment of a gas containing organic sulphur compounds for the conversion of said organic sulphur compounds which method comprises soaking a porous catalyst support in a solution of a salt of one of the group consisting of nickel and cobalt, which salt contains oxygen and sulphur and is directly reducible to sulphide, drying the impregnated support and converting the salt to sub-sulphide by heating at a temperature between 300° and 500° C. in a stream of coal gas which contains substantially no sulphur dioxide and which has previously been treated for the conversion of organic sulphur compounds therein.

5. A method of preparing a catalyst consisting of the sub-sulphide of one of the group consisting of nickel and cobalt which comprises exhausting air from a porous catalyst support and immersing the said support in a solution of a salt selected from the group consisting of nickel sulphate, sulphite, thiosulphate and sulphamate and cobalt sulphate, sulphite, thiosulphate and sulphamate, drying the impregnated support and converting the salt to sub-sulphide by heating at a temperature between 300° and 500° C. in a stream of reducing gas consisting essentially of free hydrogen and containing no sulphur dioxide.

6. A method of preparing a supported sub-sulphide nickel catalyst which comprises soaking china clay pellets having a porosity of the order of 25% in a boiling aqueous solution of nickel sulphate, drying the impregnated support at substantially 100° C. for one hour and reducing the nickel sulphate to nickel sub-sulphide ($Ni_3S_2$) by heating in a stream of coal gas containing substantially no sulphur dioxide at a temperature of 350° C. for two hours.

7. A method of preparing a catalyst consisting of the sub-sulphide of one of the group consisting of nickel and cobalt for the decomposition of organic sulphur compounds in a combustible gas, which method comprises soaking a porous catalyst support in a solution of a salt selected from the group consisting of nickel sulphate, sulphite, thiosulphate, and sulphamate and cobalt sulphate, sulphite, thiosulphate and sulphamate, drying the impregnated support and converting the salt therein into sub-sulphide by heating at a temperature between 300° and 500° C. in a stream of reducing gas containing free hydrogen by adding the impregnated support to the top of a bed of a similar catalyst through which the reducing gas is passed for the purpose of decomposing organic sulphur compound therein.

8. A method of preparing a catalyst consisting of the sub-sulphide of one of the group consisting of nickel and cobalt for the decomposition of organic sulphur compounds in coal gas, which method comprises soaking a porous catalyst support in a solution of a salt selected from the group consisting of nickel sulphate, sulphite, thiosulphate and sulphamate and cobalt sulphate, sulphite, thiosulphate and sulphamate, drying the impregnated support and converting the salt to sub-sulphide by heating at a temperatures between 300° and 500° C. in a stream of coal gas by passing the coal gas through a bed of the said catalyst and adding the dried impregnated support to the top of the catalyst bed and removing the catalyst intermittently from the bottom of the said catalyst bed.

9. A method of preparing a catalyst consisting of the sub-sulphide of one of the group consisting of nickel and cobalt for the decomposition of organic sulphur compounds in coal gas, which method comprises soaking a porous catalyst support in a solution of a salt selected from the group consisting of a nickel sulphate, sulphite, thiosulphate and sulphamate and cobalt sulphate, sulphite, thiosulphate and sulphamate, drying the impregnated support and converting the salt to sub-sulphide by heating at a temperature between 300° and 500° C. in a stream of coal gas by passing the coal gas through a bed of the said catalyst and adding the dried impregnated support to the top of the said catalyst bed and removing the catalyst continuously from the bottom of the said catalyst bed.

10. A method of preparing a catalyst consisting of the sub-sulphide of one of the group consisting of nickel and cobalt for the decomposition of organic sulphur compounds in water gas, which method comprises soaking a porous catalyst support in a solution of a salt selected from the group consisting of nickel sulphate, sulphite, thiosulphate and sulphamate and cobalt sulphate, sulphite, thiosulphate and sulphamate, drying the impregnated support and converting the salt to sub-sulphide by heating at a temperature between 300° and 500° C. in a stream of water gas by passing the gas through a bed of the said catalyst and adding the dried impregnated support to the top of the catalyst bed and removing catalyst intermittently from the bottom of the said catalyst bed.

11. A method of preparing a catalyst consisting of the sub-sulphide of one of the group consisting of nickel and cobalt for the decomposition of organic sulphur compounds in water gas, which method comprises soaking a porous catalyst support in a solution of a salt selected from the group consisting of nickel sulphate, sulphite, thiosulphate and sulphamate and cobalt sulphate, sulphite, thiosulphate and sulphamate, drying the impregnated support and converting the salt to sub-sulphide by heating at a temperature between 300° and 500° C. in a stream of water gas by passing the water gas through a bed of the said catalyst and adding the dried impregnated support to the top of the said catalyst bed and removing catalyst continuously from the bottom of the said catalyst bed.

ROLAND HALL GRIFFITH.
JOHN HERBERT GEOFFREY PLANT.